March 20, 1928.

T. SCHOU ET AL 1,663,318

ELECTRIC MACHINE

Filed June 4, 1923

Witness:
Dav. S. Magnusson

Inventor:
Theodor Schou
By Richard L. Behrens
Nissen & Crane Attys.

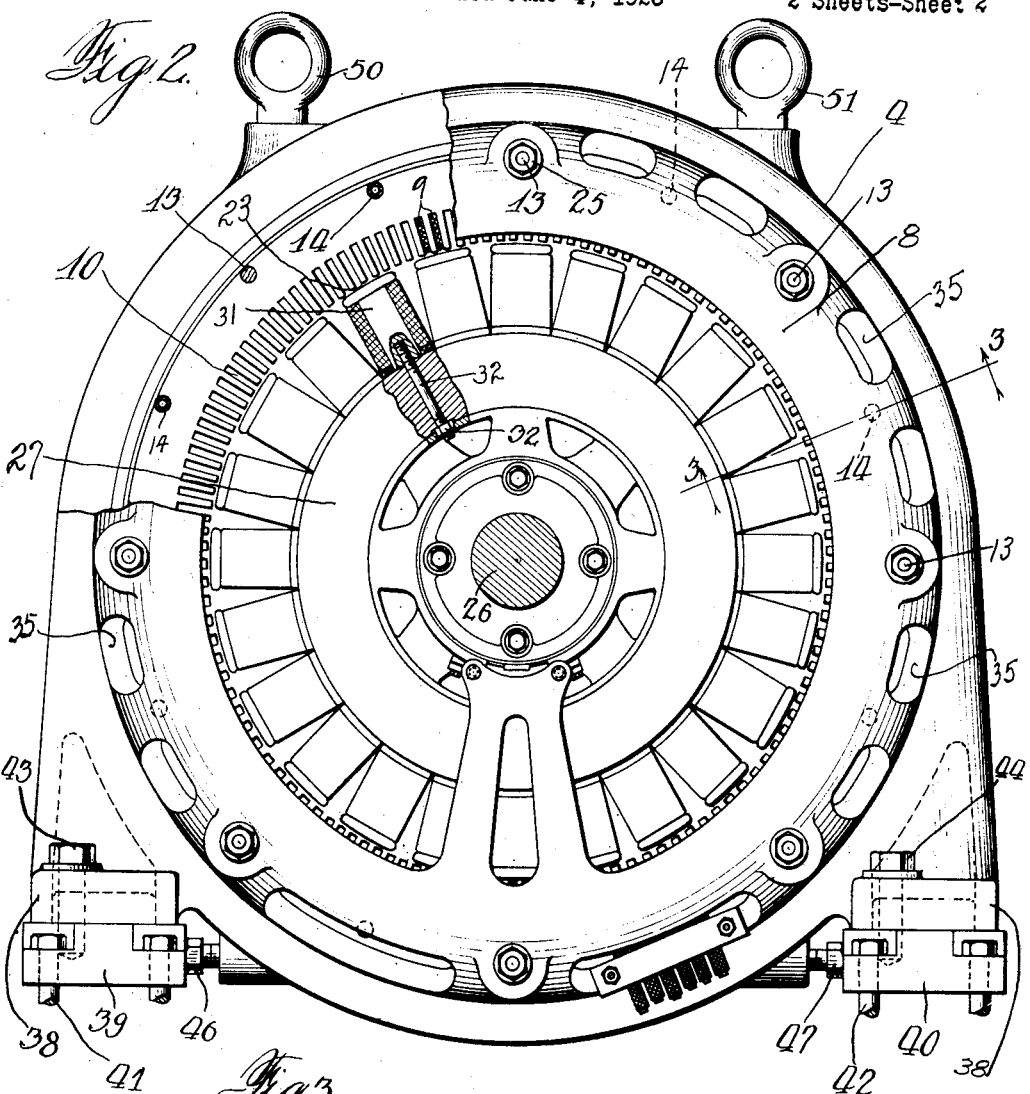

Patented Mar. 20, 1928.

1,663,318

UNITED STATES PATENT OFFICE.

THEODOR SCHOU AND RICHARD L. BEHRENS, OF MANSFIELD, OHIO, ASSIGNORS TO THE IDEAL ELECTRIC & MANUFACTURING COMPANY, OF MANSFIELD, OHIO, A CORPORATION OF OHIO.

ELECTRIC MACHINE.

Application filed June 4, 1923. Serial No. 643,159.

Our invention relates to electrical machines and more particularly to dynamo and motor constructions, and has for one of its objects the provision of simple and efficient means and method for constructing electrical machines of the character mentioned and the provision of electrical machines which may be economically manufactured in different capacities and sizes, and which when completed will be of improved construction and operation.

An embodiment of our invention is illustrated in the accompanying drawings, forming a part of this specification, and in which—

Fig. 2 is a side elevation of the same, smaller in size than Fig. 1, with portions broken away to show underlying parts; and Fig. 3 is a fragmental section taken on line 3—3 of Fig. 2.

Figure 1:
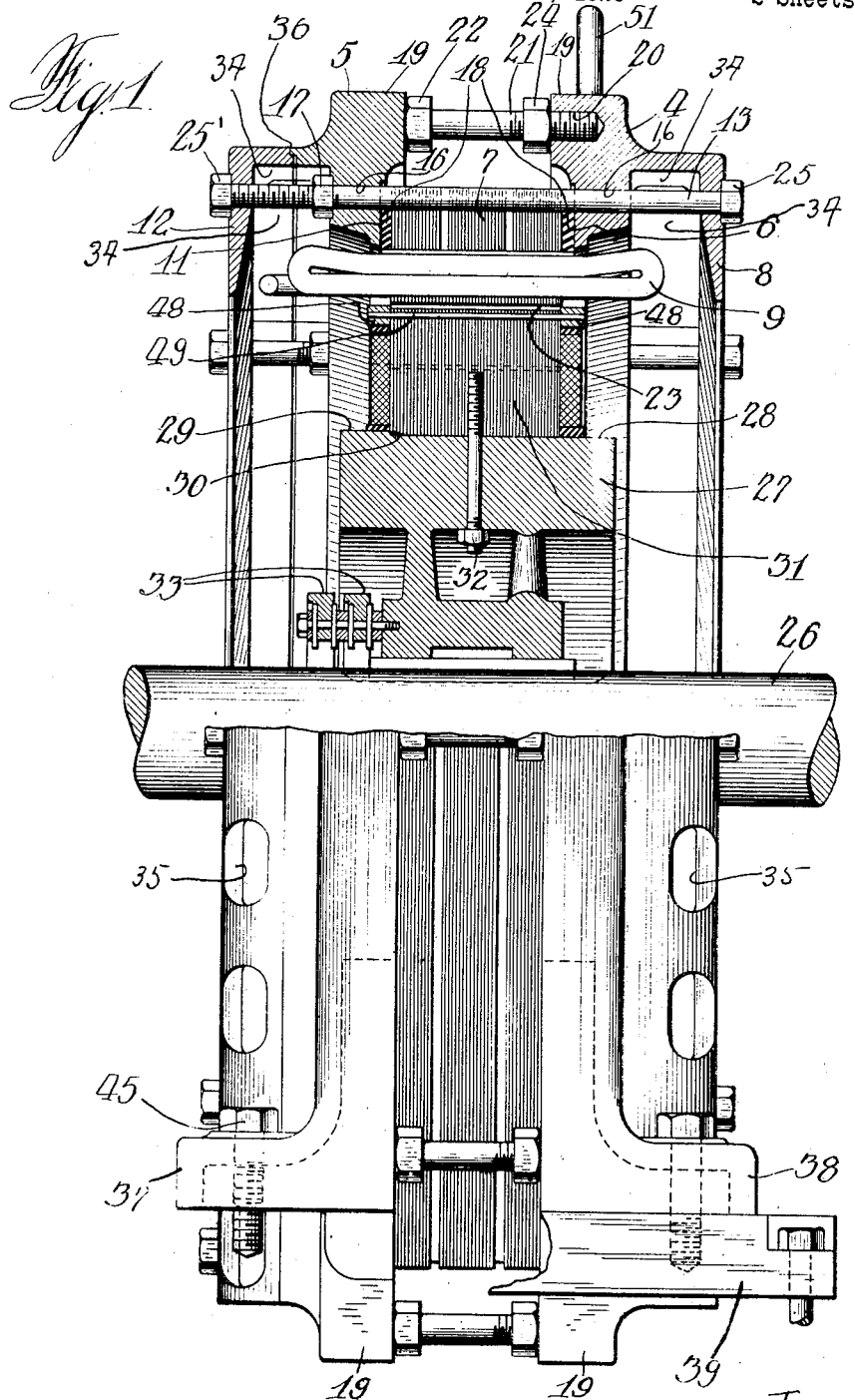
Fig. 1 is an edge view with a portion broken away to show underlying parts.

Referring more particularly to the drawings, we have illustrated a dynamo electric machine of the alternating current motor type as an embodiment of our invention. In this construction the stator frame is composed of two separate detachable stator heads 4 and 5. The stator head 4 is annular in shape with an annular seat 6 adapted to engage tooth supports 18 at the side of a stack of core laminations 7. The head 4 is also provided with an annular guard 8 adapted to extend over and protect the windings 9 of the stator of the dynamo electric machine. Although only one coil 9 is shown in Figs. 1 and 3 to illustrate how the stator windings are applied, it should be understood that these coils are placed in a well-known manner in slots 10 (see Fig. 2) in the laminations 7, as shown in Fig. 1. The guard 8 of Fig. 1 is attached to the head 4.

The head 5 is provided with an annular seat 11 similar to the annular seat 6 and arranged symmetrically with respect thereto in position to engage the other side of the stack of core laminations 7 so that the latter will be clamped between said seats 6 and 11 to hold them rigidly in place. The head 5 is provided with a detachable guard 12 similar to that designated 8 on the other side of the motor and arranged symmetrically with respect thereto. This guard 12 is adapted to cover and protect the other ends of the coils 9. The guard 12 is detachably secured to the head 5 so that the coils 9 may be easily placed in position and connected before the guard 12 is arranged on the head 5.

After the iron or steel casting has been properly machined, drilled and tapped to form the stator head 4, the latter is laid down on a support and the through bolts 13 (Figs. 1 and 2) and the tubular pins 14 (Figs. 2 and 3) placed in upright positions, that is, in position to receive the core laminations 7. That is to say, the bolts 13 are extended through the opening 16 in the head 4 and the tubular pins 14 are placed in the recesses 15. The laminations 7 are then stacked with proper provision made for ventilation. The stator head 5 which is provided with recesses 15 for the tubes 14 and with perforations 16 for the bolts 13 is then placed in position and the nut 17 tightened down so as to securely clamp the laminations 7 rigidly between the stator heads 4 and 5. The spaced-apart perforations at the outer periphery of the laminations 7 are adapted to be placed over the bolts 13 and the tubular pins 14, as shown in Fig. 2, so as to hold all of the laminations concentric and therefore properly arrange the inner edges of the laminations at the air gap 23.

It should be particularly noted that the spaced-apart stator heads 4 and 5 are separate and have no frame parts between them, but are rigidly connected together by the same mechanism which connects together the laminations 7. Therefore, frames of different widths in accordance with variation of width of the stacked laminations become unnecessary. The electrical design may be varied within wide limits by the use of standardized parts such as the stator heads 4 and 5 and the laminations 7, because the width of the stack of laminations may be varied without furnishing frames of different widths between stator heads, follower rings, or otherwise. In the construction illustrated alternate tubular pins and through bolts are used in assembling the machine and after the laminations have been arranged to have the width as predetermined by the electrical design of the machine the through bolts are operated so as to give the laminations the desired tightness. It is an important feature of our invention that the construction is such that the dynamo electric machine is not limited to various core widths and different frame castings, but the stator heads may be standardized for a wide range of electrical designs and therefore kept in stock and thus materially speed up production and delivery of machines for various requirements.

The stator heads 4 and 5 have angular peripheral portions 19 which are adapted to have located between them reaction jack screws 21 spaced apart around the peripheries, as shown in Fig. 1. A plurality of threaded recesses 20 in the head 4 are adapted to receive the bolts which are provided with heads 22. It should be understood that after assembling the electric machine including the tightening up of the through bolts 13 by operation of the nuts 17 and 25, the jack bolts 21 are tightened up which tends to spread apart the peripheral portions 19 and this has the effect of tightening the seats 6 and 11 against the laminations 7, overcoming the tendency of laminations 7 to flare. When the reaction jack screws are tightened up the tendency of the core to flare at the air gap is eliminated. The nuts 24 are then operated to lock the jack bolts 21 in adjusted positions.

The stator head opposite that designated 4 is in reality split at 36 or arranged to comprise two separable parts 5 and 12 so as to facilitate the winding and connecting of the coils 9 in the slots 10 of the laminations 7. After the through bolts 13 have been tightened and the jack screws 21 operated or adjusted, the windings 9 may be placed in the slots 10.

After the armature coils 9 have been placed in slots 10 and connected the guard ring 12 is then placed in position and the nuts 25' adjusted on the ends of the through bolts 13 to complete the frame.

It will be noted that the space between the heads 4 and 5 is open around the entire peripheral portion of the laminations 7, thus providing an air circulating space to facilitate radiation of heat from the electrical windings and the core 7 therefor. Furthermore, the annular spaces 34, 34 between the shoulders 6 and 11 and the guard rings 8 and 12 provide spaces for circulation of air around the exposed ends of the windings in the slots 10. The guard rings 8 and 12 are also provided with a multiplicity of openings 35 to facilitate the free circulation of air out from the annular spaces 34.

The rotor of the alternator is mounted on the shaft 26 and comprises a spider 27 secured to the shaft so as to rotate therewith.
The peripheral portion of the spider 27 is substantially cylindrical at 29 with one portion of reduced diameter at 28 so as to provide an annular radial shoulder 30 against which one side of each rotor lamination core unit 31 may be positioned. The laminated poles 31 will thus be prevented from turning sidewise on the support because of the shoulder 30 which is machined in the rim of the spider.

Any desirable mounting means may be provided for the electric machine. We have indicated an ordinary means for mounting the device by providing the metal cross-supports 39 and 40 which are adapted to be bolted to a suitable foundation, as indicated at 41 and 42. The stator frame 4 may be provided with spaced-apart feet 38, as shown in Fig. 2, and the stator frame 5 may be provided with similar spaced-apart feet 37. Bolts 43, 44 and 45 pass loosely through slots in the feet 37 and 38 and fit into screw-threaded recesses in the cross-supports 39 and 40. Therefore, when the bolts 43, 44 and 45 are loosened, the bolts 46 and 47 may be operated so as to move the motor frame sidewise to adjust the center thereof. After the motor frame has been adjusted to the desired position the bolts 43, 44 and 45 may be tightened so as to lock the motor frame in adjusted position.

Our arrangement is adapted for dynamo electric machines in general, but in particular to alternators, and more particularly slow speed synchronous machines. In the case of synchronous motors a squirrel cage winding illustrated diagrammatically at 48 and 49 in Fig. 1 may be used in starting the motor, and such squirrel cage winding may also be relied upon to assist in holding the laminations 31 in position. In addition to this means we prefer to hold the laminations together by spot or surface welding. We thus eliminate entirely the use of steel rivets for holding together the pole laminations. Such steel rivets necessitate a certain limit to the width of the pole body, whereas by using spot and surface welding the width of the poles 31 may be varied within wide limits in accordance with the width of the stack of laminations 7.

After the laminated pole pieces 31 have been built up in the manner described and adjusted in position against the shoulder 30 a single bolt 32 may be used for each pole piece 31 to hold the latter rigidly connected to the peripheral surface 28 of the spider 27. It will thus be seen that by providing the annular shoulder 30 to prevent twisting of the pole piece 31 a single bolt may be efficiently used to hold the pole piece firmly secured to the spider 27. Insulated collector rings 33 may be mounted on the hub of the spider 27, as shown in Fig. 1.

The stator frame 4 may be provided with spaced-apart hoisting rings 50 and 51 so as to facilitate the mounting of the completely assembled machine in the usual manner.

It should be noted that the construction and method of assembly herein disclosed are particularly adapted to synchronous alternating current motors and that for a given horse power the motor may be made very compact and although the horse power is substantially increased such compactness may be maintained. Furthermore, it will be seen that a minimum number of different sized parts will be required for producing various electrical designs. The cost of production both as to labor and material is therefore greatly reduced both with respect to the parts used and the assembly thereof. The cost of preparing a few sizes of castings will also be much less than machining a large number of sizes for the different sizes of machines to be used. The laminated cores both on the stator and on the rotor may be varied in thickness in accordance with the electrical design. The means for securing together the rotor pole pieces and for securing them to the rotor spider reduces the cost of production, but it should be understood that this means of securing the cores to a rotor is equally applicable to alternators in general, both generators and motors. It will thus be seen that the disclosure herein made includes the advantage of reducing the large number of expensively machined castings usually employed in the manufacture of electrical machines. This is possible by applicants being able to use a few sizes of core and rotor castings and obtaining various designs of machines by varying the number of core laminations used and the windings therefor.

Obviously those skilled in the art may make various changes in the details and arrangement of parts without departing from the spirit and scope of the invention as defined by the claims hereto appended and we wish therefore not to be restricted to the precise construction herein disclosed.

Having thus fully described an embodiment of our invention, what we desire to secure by Letters Patent of the United States is:

1. An electrical machine comprising an armature core made up of a plurality of laminations, stator heads disposed on the remote sides of said armature core, means holding said stator heads rigidly against the core, and additional means for holding said stator heads in position to maintain an even core width.

2. An electrical machine comprising an annular core, two annular frame parts on opposite sides of the core and secured tightly against the latter, and adjusting screws between the peripheral edges of the frame parts tending to secure even pressure throughout the core.

3 An electrical machine comprising an annular core, two annular frame parts having portions extending over onto the outer sides of the core with portions of said frame parts extending radially beyond the periphery of the core, and screws attached to one of the frame parts and engaging the other frame part tending to separate the outer peripheral edges of the frame parts and thereby tending to bind the inner peripheral edges of said frame parts tightly against the core.

4. An electrical machine comprising an annular core, annular frame parts disposed on opposite sides of the core with portions of the frame parts extending radially beyond the periphery of the core, screws threaded in one of the frame parts and engaging an adjacent side of the other frame part, and lock nuts on said screws holding the latter against retrograde movement.

5. An electrical machine comprising a rotor having a cylindrical periphery with a shoulder in a plane at right angles to the axis thereof, and field cores formed separately from one another and attached to the rotor with an edge of each core disposed against said shoulder so that the latter is adapted to facilitate holding said core against twisting.

6. An electrical machine comprising a rotor having its periphery cylindrical with one portion of greater diameter than another portion and a shoulder between said cylindrical portions in a plane at right angles to the axis of said rotor, a plurality of pole cores disposed on the smaller cylindrical surface of the rotor with the side of each pole core against said shoulder, and a single securing means fastening each core on the rotor against said shoulder.

7. An electrical machine comprising a rotor having a cylindrical surface and a radial shoulder, a pole core disposed on the periphery of said rotor with one side tightly against said shoulder, and a single bolt passing through the rotor and threaded in said pole core holding the latter on said rotor against said shoulder.

8. An electrical machine comprising spaced-apart frames having inner annular shoulders, a stack of laminations adapted to be placed between said shoulders with their inner edges at the air gap of the machine, means for securing said laminations and said frame in rigid relation, and mechanism at the peripheral portions of said frames for tightening the laminations at the air gap to minimize flaring.

In testimony whereof we have signed our names to this specification on this 29th day of May, A. D. 1923.

THEODOR SCHOU.
RICHARD L. BEHRENS.